United States Patent
Richter et al.

(10) Patent No.: US 8,906,509 B2
(45) Date of Patent: Dec. 9, 2014

(54) PROCESS FOR THE PRODUCTION OF A DARK-COLOR MULTI-LAYER COATING

(75) Inventors: Gunter Richter, Wuppertal (DE); Karl-Friedrich Dossel, Wuppertal (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 754 days.

(21) Appl. No.: 12/993,114

(22) PCT Filed: May 27, 2009

(86) PCT No.: PCT/US2009/045269
§ 371 (c)(1),
(2), (4) Date: Nov. 17, 2010

(87) PCT Pub. No.: WO2009/146318
PCT Pub. Date: Dec. 3, 2009

(65) Prior Publication Data
US 2011/0070455 A1    Mar. 24, 2011

Related U.S. Application Data

(60) Provisional application No. 61/130,342, filed on May 30, 2008.

(51) Int. Cl.
| | |
|---|---|
| *C09D 5/00* | (2006.01) |
| *B32B 15/04* | (2006.01) |
| *B05D 7/00* | (2006.01) |
| *B05D 7/14* | (2006.01) |
| *B05D 5/06* | (2006.01) |
| *B32B 15/08* | (2006.01) |
| *C09D 5/33* | (2006.01) |
| *C09D 5/38* | (2006.01) |
| *C09D 7/12* | (2006.01) |
| *C08K 3/08* | (2006.01) |

(52) U.S. Cl.
CPC ............ *B32B 15/043* (2013.01); *B05D 7/52* (2013.01); *B05D 7/536* (2013.01); *B05D 7/546* (2013.01); *B05D 7/14* (2013.01); *B05D 7/56* (2013.01); *B05D 7/57* (2013.01); *B05D 5/067* (2013.01); *B05D 5/068* (2013.01); *B32B 15/08* (2013.01); *B05D 7/54* (2013.01); *B05D 7/572* (2013.01); *B05D 7/577* (2013.01); *C09D 5/004* (2013.01); *C09D 5/38* (2013.01); *C09D 7/1291* (2013.01); *B05D 5/06* (2013.01); *C08K 3/08* (2013.01)
USPC ............. 428/457; 427/383.1; 427/419.1

(58) Field of Classification Search
USPC ........................................ 427/407.1
See application file for complete search history.

(56) References Cited

U.S. PATENT DOCUMENTS

| | | | |
|---|---|---|---|
| 2006/0293413 A1* | 12/2006 | Sapper ............ | 523/171 |
| 2010/0047620 A1* | 2/2010 | Decker et al. ........ | 428/688 |
| 2012/0107584 A1* | 5/2012 | Eibon et al. ......... | 428/212 |

* cited by examiner

Primary Examiner — William Phillip Fletcher, III
(74) Attorney, Agent, or Firm — Ingrassia Fisher & Lorenz, P.C.

(57) ABSTRACT

A process for the production of a dark-color multi-layer coating, comprising the successive steps:
(1) applying an NIR-opaque coating layer A' from a pigmented, solvent- or waterborne coating composition A to a substrate,
(2) applying a coating layer B' from a pigmented coating composition B onto the substrate provided with coating layer A',
wherein the pigment content of coating composition A consists 90 to 100 wt. % of at least one aluminum flake pigment and 0 to 10 wt. % of at least one further pigment, which is selected in such a way that NIR-opaque coating layer A' exhibits low NIR absorption,
wherein the pigment content of coating composition A comprises <90 wt. % of 10 to 80 nm thick aluminum flake pigments,
wherein the pigment content of coating composition B consists 50 to 100 wt. % of at least one black pigment with low NIR absorption and 0 to 50 wt. % of at least one further pigment, which is selected in such a way that coating layer B' exhibits low NIR absorption and that the dark-color multi-layer coating exhibits a brightness L* (according to CIEL*a*b*, DIN 6174), measured at an illumination angle of 45 degrees to the perpendicular and an observation angle of 45 degrees to the specular, of at most 10 units,
wherein the sum of the respective wt. % equals 100 wt. %, and wherein the coating layers A' and B' are cured.

10 Claims, No Drawings

PROCESS FOR THE PRODUCTION OF A DARK-COLOR MULTI-LAYER COATING

CROSS-REFERENCE TO RELATED APPLICATION

This application is a U.S. National-Stage entry under 35 U.S.C. §371 based on International Application No. PCT/US2009/045269, filed May 27, 2009, which was published under PCT Article 21(2), which claims the benefit of US Provisional Application 61/130,342, filed May 30, 2008.

FIELD OF THE INVENTION

The invention is directed to a process for the production of a dark-color multi-layer coating.

DESCRIPTION OF THE PRIOR ART

Dark-color coatings often contain carbon black pigments which absorb radiation in the near-infrared wavelength range and transform it into heat. Substrates coated with paint coatings of this type heat up in the NIR-containing sunlight; this occurs via heat conduction, i.e., heat is directly transferred to the substrate from the coating layer containing carbon black pigments and heated by solar radiation. This type of heating is often undesirable; for example, it may be undesirable for the actual substrate material itself and/or for the interior of the substrate to be heated up. Motor vehicles are probably the most prominent examples of substrates which comprise an interior. Vehicles with light-color coatings do not heat up as much and less fuel is required to operate the vehicle air-conditioning system than in corresponding models painted in a dark color.

A method is known from U.S. 2006/0286303 A1 for producing multi-layer coatings, during which a substrate provided with an electrodeposition coating layer is provided in a wet-on-wet-on-wet coating process with a first coating layer made of an aqueous coating composition, which contains 200 to 500 nm thick aluminum platelet pigments, then with a coating layer in a layer thickness below black/white opacity and which is made of a waterborne base coat, and finally with a clear coating layer. The aqueous coating composition used for the production of the first coating layer may contain carbon black pigments. The waterborne base coat may contain various pigments, inter alia carbon black pigments.

SUMMARY OF THE INVENTION

It has been found that substrates with dark-color multi-layer coatings which heat up only comparatively slightly in sunlight may be produced using the process described hereinafter.

The invention is directed to a process for the production of a dark-color multi-layer coating, comprising the successive steps:
(1) applying an NIR-opaque coating layer A' from a pigmented, solvent- or waterborne coating composition A to a substrate,
(2) applying a coating layer B' from a pigmented coating composition B onto the substrate provided with coating layer A',
wherein the pigment content of coating composition A consists 90 to 100 wt. % (weight-%) of at least one aluminum flake pigment and 0 to 10 wt. % of at least one further pigment, which is selected in such a way that NIR-opaque coating layer A' exhibits low NIR absorption,
wherein the pigment content of coating composition A comprises <90 wt. % of 10 to 80 nm thick aluminum flake pigments,
wherein the pigment content of coating composition B consists 50 to 100 wt. % of at least one black pigment with low NIR absorption and 0 to 50 wt. % of at least one further pigment, which is selected in such a way that coating layer B' exhibits low NIR absorption and that the dark-color multi-layer coating exhibits a brightness $L^*$ (according to CIEL*a*b*, DIN 6174), measured at an illumination angle of 45 degrees to the perpendicular (surface normal) and an observation angle of 45 degrees to the specular (specular reflection), of at most 10 units,
wherein the sum of the respective wt. % equals 100 wt. %, and wherein the coating layers A' and B' are cured.

DETAILED DESCRIPTION OF THE EMBODIMENTS

The term "dark-color multi-layer coating" is used in the description and the claims. It refers to multi-layer coatings exhibiting a brightness $L^*$ (according to CIEL*a*b*, DIN 6174), measured at an illumination angle of 45 degrees to the perpendicular and an observation angle of 45 degrees to the specular, of at most 10 units. Examples of such dark colors are corresponding dark-green, dark-blue, dark-red, dark-brown, dark-grey and black color shades and they include solid colors (single-tone colors) and special effect colors (colors characterized by color and/or brightness flop dependent on the angle of observation) like metallic and/or mica color shades.

The measurement of the brightness $L^*$ at an illumination angle of 45 degrees to the perpendicular and an observation angle of 45 degrees to the specular is known to the person skilled in the art and can be carried out with commercial professional measuring instruments, for example, the instrument X-Rite MA 68 sold by the firm X-Rite Incorporated, Grandeville, Mich., USA.

The abbreviation "NIR" used in the description and the claims stands for "near infrared" or "near infrared radiation" and shall mean infrared radiation in the wavelength range of 780 to 2100 nm.

The term "NIR-opaque coating layer" is used in the description and the claims. It refers to a dried or hardened pigmented coating layer with a film thickness at least as thick that underlying substrate surfaces (substrate surfaces located directly beneath the coating layer) with different NIR absorption are no longer discernible by NIR reflection measurement (no longer distinguishable from each other by NIR reflection measurement), i.e., at or above this minimum dry film thickness no difference can be determined when measuring the NIR reflection of the coating layer applied to such different substrate surfaces and dried or hardened; or to put it into other words, the NIR reflection curve measured is then only determined by the NIR-opaque coating layer. In still other words, an NIR-opaque coating layer is characterized in that its dry film thickness corresponds to or exceeds said minimum film thickness, but may not fall below it. It goes without saying that this minimum film thickness depends on the pigmentation of the respective coating layer, i.e., it depends on the composition of the pigment content as well as on the pigment/resin solids weight ratio. In order to determine said minimum film thickness, the respective coating composition may be applied in a wedge shape onto a black and white chart and dried or hardened. Black and white charts are typically used when determining black/white opacity of coating compositions (see, for example, ISO 6504-3:2006 (E), method B). NIR reflection measurement is known to the person skilled in the art and can be carried out making use of a conventional NIR spectrophotometer (measuring geometry 8°/d), for example, the instrument Lambda 19 sold by the firm Perkin-Elmer. NIR-opacity of an NIR-opaque coating layer can be the result of NIR absorption and/or NIR reflection and/or NIR scattering.

The term "film thickness" is used herein. It refers always to the dry film thickness of the respective dried or hardened coating. Accordingly, any film thickness values indicated in the description and in the claims for coating layers refer in each case to dry film thicknesses.

The term "pigment content" is used herein. It means the sum of all the pigments contained in a coating composition without fillers (extenders, extender pigments). The term "pigments" is used here as in DIN 55944 and covers, in addition to special effect pigments, inorganic white, colored and black pigments and organic colored and black pigments. At the same time, therefore, DIN 55944 distinguishes between pigments and fillers.

The term "resin solids" is used herein. The resin solids of a coating composition consist of the solids contribution of the coating binders (binder solids) and the solids contribution of crosslinkers (crosslinker solids) optionally contained in the coating composition.

The term "black/white opacity" is used herein. It refers to the dry film thickness of a pigmented coating composition wherein the contrast between the black and white fields of a black and white chart coated with the coating composition is no longer visually discernible (mean film thickness value determined on the basis of evaluation by 5 independent individuals). It goes without saying that this film thickness depends on the pigmentation of the respective coating layer, i.e., it depends on the composition of the pigment content as well as on the pigment/resin solids weight ratio. Following ISO 6504-3:2006 (E), method B, in order to determine said film thickness, the pigmented coating composition of which the black/white opacity is to be investigated may be applied in a wedge shape onto a black and white chart and dried or hardened.

The term "coating layer A' exhibiting low NIR absorption" is used in the description and the claims. It shall mean an NIR-opaque coating layer A' which exhibits an NIR reflection of at least 48% over the entire NIR wavelength range of 780 to 2100 nm, i.e., at any wavelength within this NIR wavelength range. The NIR reflection measurement can be carried out as explained above.

The term "coating layer B' exhibiting low NIR absorption" is used in the description and the claims. It shall mean a coating layer B' which would exhibit an NIR reflection of at least 33% over the entire NIR wavelength range of 780 to 2100 nm, if it were applied and dried or hardened on an NIR-opaque coating layer pigmented exclusively with at least one 100 to 1000 nm thick aluminum flake pigment. The person skilled in the art may, for example, produce test panels provided with a dried or cured coating layer applied from a coating composition pigmented exclusively with at least one 100 to 1000 nm thick aluminum flake pigment, and may use said test panels as test substrates for coating with coating compositions to be tested for their NIR absorption. Once the coating layer applied from the coating composition to be tested has dried or cured, the NIR reflection of said coating layer can be measured. The NIR reflection measurement itself can be carried out as explained above. The method mentioned in this paragraph can be used by the skilled person when developing the pigmentation of a coating composition B.

In step (1) of the process according to the invention substrates are coated with an NIR-opaque coating layer A' exhibiting low NIR absorption. The substrates may comprise various materials including, for example, metals and plastics including metal parts, metal foils, plastic parts and plastic foils; parts may or may not comprise an interior. The substrates may be uncoated or provided with a precoating consisting of one or more coating layers. In particular, the uncoated or precoated substrates are substrates which exhibit considerable NIR absorption as a property of the substrate material itself and/or as a property of a precoating; this may be the case, for example, if the substrate material and/or at least one relevant coating layer of the precoating contain(s) a certain amount of pigments with strong NIR absorption such as carbon black, for example, 0.1 to 10 wt. % of carbon black. The substrates include, in particular, vehicles which can be used for transporting people and/or goods as well as corresponding vehicle parts and accessories, wherein the term "vehicle" includes motorized and unmotorized vehicles including aircraft, water craft, rail vehicles and road vehicles. In particular, the substrates are road vehicles and road vehicle parts, more specifically car bodies, car body parts and car body fittings which have generally been precoated. Car bodies or car body parts made of metal generally comprise, for example, an electrodeposition primer and, optionally, a primer surfacer layer applied thereto whilst car body parts or car body fittings made of plastics material may be provided with a plastics primer.

In an embodiment the substrates comprise car bodies or car body metal parts provided with an electrodeposition primer, wherein the electrodeposition primer contains carbon black, for example, 0.5 to 4 wt. % of carbon black.

In a further embodiment the substrates comprise car bodies or car body metal parts provided with an electrodeposition primer and a primer surfacer layer, wherein both the electrodeposition primer and the primer surfacer layer or only the primer surfacer layer contain(s) carbon black, for example, 0.5 to 4 wt. % of carbon black.

The NIR-opaque coating layer A' applied in step (1) of the process of the present invention is applied from a pigmented coating composition A. Coating composition A is a solvent- or waterborne coating composition, i.e., it contains (i) one or more organic solvents or (ii) water or (iii) water and one or more organic solvents. In addition to water and/or organic solvent(s) and its pigment content coating composition A comprises a resin solids content and the following optional components: fillers and conventional coating additives.

The resin solids of coating composition A comprise one or more conventional coating binders known to the person skilled in the art. Examples include polyester, polyurethane and (meth)acrylic copolymer resins and also hybrid binders derived from these resin classes. Furthermore the resin solids may comprise one or more conventional crosslinkers, such as, for example, free or blocked polyisocyanates and aminoplast resins, and one or more paste resins (grinding resins; resins used for pigment grinding) or polymeric pigment wetting or dispersion aids. If paste resins or polymeric pigment wetting or dispersion aids are comprised they are counted as binders.

Coating composition A comprises a pigment content consisting 90 to 100 wt. % of at least one aluminum flake pigment and 0 to 10 wt. % of at least one further pigment which is selected in such a way that NIR-opaque coating layer A' exhibits low NIR absorption, wherein the sum of the wt. % equals 100 wt. %, further wherein the pigment content of coating composition A comprises <90 wt. % of 10 to 80 nm thick aluminum flake pigments. Generally, the pigment/resin solids ratio by weight of coating composition A is, for example, 0.1:1 to 1:1.

Generally, the at least one aluminum flake pigment comprises one or more 100 to 1000 nm thick aluminum flake pigments and, optionally, one or more 10 to 80 nm thick aluminum flake pigments, wherein the proportion of the latter is such that it accounts for less than 90 wt. % of the pigment content of coating composition A.

The 100 to 1000 nm thick aluminum flake pigments are special effect pigments and have a mean particle diameter (average particle size) of, for example, 5 to 50 µm, preferably 5 to 35 µm. The term "mean particle diameter" refers to d50 values determined by laser diffraction (50% of the particles have a particle diameter above and 50% of the particles have a particle diameter below the mean particle diameter), such as may be inferred, for example, from the technical documents of manufacturers of aluminum flake pigments. The aluminum flake pigments are, in particular, aluminum flake pigments of the leafing or preferably non-leafing type that are conventional in paint and coatings and are known to the person skilled in the art. The aluminum flake pigments may be unpassivated or passivated. Passivated types are, for example, phosphated (treated with phosphoric and/or phosphonic acid derivatives), chromated or coated with a silicon-oxygen network. In case of a waterborne coating composition A passivated types are preferably used.

Non-leafing aluminum flake pigments passivated by phosphating are known. Examples of commercially available non-leafing aluminum flake pigments passivated by phosphating are the non-leafing aluminum flake pigments sold by the firm Eckart-Werke under the name "STAPA Hydrolac®".

Non-leafing aluminum flake pigments passivated by chromating are known. Examples of commercially available non-leafing aluminum flake pigments passivated by chromating are the non-leafing aluminum flake pigments sold by the firm Eckart-Werke under the name "STAPA Hydrolux®".

Non-leafing aluminum flake pigments coated with a silicon-oxygen network and their production are also known, for example, from WO 99/57204, U.S. Pat. No. 5,332,767 and from A. Kiehl and K. Greiwe, Encapsulated aluminum pigments, Progress in Organic Coatings 37 (1999), pp. 179 to 183. The surface of the non-leafing aluminum flake pigments is provided with a coating of a silicon-oxygen network. The silicon-oxygen network can be connected to the surface of the non-leafing aluminum flake pigments via covalent bonds. The term "non-leafing aluminum flake pigments coated with a silicon-oxygen network" includes in accordance with the above explanations both non-leafing aluminum flake pigments with a coating of a purely inorganic silicon-oxygen network and non-leafing aluminum flake pigments with a coating of a silicon-oxygen network modified with corresponding organic groups or polymer-modified. Examples of commercially available non-leafing aluminum flake pigments coated with a silicon-oxygen network are the non-leafing aluminum flake pigments sold by the firm Eckart-Werke under the name "STAPA IL Hydrolan®" and those sold by the firm Schlenk under the name "Aquamet® CP".

The 10 to 80 nm, preferably 20 to 80 nm thick aluminum flake pigments are special effect pigments and have a mean particle diameter of, for example, 5 to 30 µm, preferably 5 to 20 µm. The mean particle diameters may be inferred, for example, from the technical documents of manufacturers of such aluminum flake pigments. The 10 to 80 nm thick aluminum flake pigments have an aspect ratio (the ratio of the flake diameter to the flake thickness) that is very high. The 10 to 80 nm thick aluminum flake pigments are produced, for example, by vacuum deposition or ultrathin grinding of special aluminum grits. The 10 to 80 nm thick aluminum flake pigments may be unpassivated or passivated. Passivated types are, for example, phosphated, chromated or coated with a silicon-oxygen network. In case of a waterborne coating composition A passivated types are preferably used. Examples of commercially available 10 to 80 nm thick aluminum flake pigments are those sold under the names Metalure®, Silvershine® and Hydroshine®, in each case by Eckart, Metasheen® by Ciba, Starbrite® by Silberline and Decomet® by Schlenk.

It is preferred that the pigment content of coating composition A consists exclusively of the at least one aluminum flake pigment. However, it may also comprise above 0 to 10 wt. % of at least one further pigment which is selected in such a way that NIR-opaque coating layer A' exhibits low NIR absorption. This means that, in case there is only one single further pigment, its wt. % proportion is selected within said range of above 0 to 10 wt. % such that NIR-opaque coating layer A' exhibits low NIR absorption; if the one single further pigment is a pigment with strong NIR absorption, the skilled person will select its wt. % proportion more at the lower end of said range of above 0 to 10 wt. %, whereas in case of one single further pigment with low NIR absorption the opposite is possible. In case there is a combination of two or more further pigments with different NIR absorption power the same principles apply and the proportion of each of the further pigments may accordingly be selected within the range of above 0 to 10 wt. %, i.e., taking into account the NIR absorption of each individual further pigment.

The person skilled in the art may easily determine the NIR absorption of a pigment, for example, by pigmenting a coating composition with the pigment in question and a 100 to 1000 nm thick aluminum flake pigment in a pigment weight ratio of 10:90, i.e., without using other pigments, by applying and drying or curing the coating composition thus pigmented in an NIR-opaque film thickness, and by measuring the NIR reflection of the resultant coating layer over the entire wavelength range of 780 to 2100 nm. The NIR reflection can be measured as explained above for the measurement of the NIR reflection of an NIR-opaque coating layer.

The further pigment(s) that may be contained in coating composition A, in addition to the at least one aluminum flake pigment, may, for example, be other special effect pigments and/or pigments selected from white, colored and black pigments.

Examples of special effect pigments other than the at least one aluminum flake pigment include conventional pigments imparting to a coating a color and/or brightness flop dependent on the angle of observation, such as non-leafing metal pigments different from aluminum, interference pigments such as, for example, metal oxide-coated metal pigments, for example, iron oxide-coated aluminum, coated mica such as, for example, titanium dioxide-coated mica, iron oxide in flake form, liquid crystal pigments, coated aluminum oxide pigments, and coated silicon dioxide pigments.

Examples of white, colored and black pigments are conventional inorganic or organic pigments known to the person skilled in the art, such as, for example, titanium dioxide, carbon black, iron oxide pigments, azo pigments, phthalocyanine pigments, quinacridone pigments, pyrrolopyrrole pigments, and perylene pigments.

It is preferred that coating composition A does not contain any carbon black.

With the exception of the at least one aluminum flake pigment as well as the possible additional special effect pigments, the other pigments that are optionally contained in the pigment content of coating composition A are generally ground. Grinding is generally performed until at least 70% of the maximum tinting strength achievable in the non-volatile system of coating composition A is achieved (non-volatile system of coating composition A means resin solids of coating composition A plus non-volatile additives of coating composition A). The determination of the maximum tinting strength is known to the person skilled in the art (compare, for example, DIN 53238). The grinding may be performed in conventional assemblies known to the person skilled in the art. Generally, the grinding takes place in a proportion of the binder or in a paste resin. The formulation is then completed with the remaining proportion of the binder or of the paste resin.

The at least one aluminum flake pigment and the optional additional special effect pigments are not ground, but are generally initially introduced in the form of a commercially available paste, optionally, combined with organic solvents and, optionally, polymeric pigment wetting or dispersion aids and/or other additives, and then mixed with the binder(s). Aluminum flake pigments and optional additional special effect pigments in powder form may first be processed with organic solvents and, optionally, polymeric pigment wetting or dispersion aids and/or other additives to yield a paste.

Coating composition A may also contain one or more fillers, for example, in a proportion of up to 20 wt. % based on the resin solids. For the fillers the same principles apply as are valid for the at least one further pigment, i.e., if fillers are contained in coating composition A, they are selected in such a way that NIR opaque coating layer A' exhibits low NIR absorption. The fillers may have a mean particle diameter of, for example, 20 nm to 3 µm. The fillers do not constitute part of the pigment content of coating composition A. Examples are barium sulfate, kaolin, talcum, silicon dioxide, layered silicates and any mixtures thereof.

Coating composition A may contain conventional additives in a total quantity of, for example, 0.1 to 5 wt. %, relative to its solids content. Examples are neutralizing agents, antifoaming agents, wetting agents, adhesion promoters, catalysts, leveling agents, anticratering agents, thickeners and light stabilizers, for example, UV absorbers and/or HALS compounds (HALS, hindered amine light stabilizers).

If coating composition A is a waterborne coating composition, it comprises water in a proportion of, for example, 60 to 90 wt. % and, optionally, also one or more organic solvents in a proportion of, for example, 0 to 20 wt. %. If it is a solventborne coating composition it does not comprise water but one or more organic solvents in a proportion of, for example, 60 to 90 wt. %.

Examples of organic solvents which can be used in coating composition A include alcohols, for example, propanol, butanol, hexanol;

glycol ethers, for example, diethylene glycol di-C1-C6-alkyl ether, dipropylene glycol di-C1-C6-alkyl ether, ethoxypropanol, ethylene glycol monobutyl ether; glycol esters, for example, ethylene glycol monobutyl ether acetate; esters, for example, butyl acetate, amyl acetate; glycols, for example, ethylene glycol and/or propylene glycol, and the di- or trimers thereof; N-alkylpyrrolidone, for example, N-methylpyrrolidone; ketones, for example, methyl ethyl ketone, acetone, cyclohexanone; aromatic or aliphatic hydrocarbons, for example, toluene, xylene or linear or branched aliphatic C6-C12 hydrocarbons.

The overall solids content of coating composition A is in the range of 10 to 40 wt. %, based on the total composition. Accordingly, the proportion of volatiles (volatile materials) is 60 to 90 wt. %. The volatiles comprise the aqueous carrier and possible volatile additives. The aqueous carrier comprises water and the possible organic solvents.

In step (2) of the process of the present invention coating layer B' is applied from a pigmented coating composition B. Coating composition B may be a powder coating composition. Preferably it is a solvent- or waterborne coating composition; then it contains (i) one or more organic solvents or (ii) water or (iii) water and one or more organic solvents. In addition to its pigment content and, in case coating composition B is a solvent- or waterborne coating composition, water and/or organic solvent(s), coating composition B comprises a resin solids content and the following optional components: fillers and conventional coating additives.

The resin solids of coating composition B comprise one or more conventional coating binders known to the person skilled in the art. Examples include polyester, polyurethane and (meth)acrylic copolymer resins and also hybrid binders derived from these resin classes. Furthermore the resin solids may comprise one or more conventional crosslinkers, such as, for example, free or blocked polyisocyanates and aminoplast resins, and one or more paste resins or polymeric pigment wetting or dispersion aids. If paste resins or polymeric pigment wetting or dispersion aids are comprised they are counted as binders.

Coating composition B comprises a pigment content consisting 50 to 100 wt. % of at least one black pigment with low NIR absorption and 0 to 50 wt. % of at least one further pigment which is selected in such a way that coating layer B' exhibits low NIR absorption and that the multi-layer coating produced by the process of the present invention exhibits a brightness L* (according to CIEL*a*b*, DIN 6174), measured at an illumination angle of 45 degrees to the perpendicular and an observation angle of 45 degrees to the specular, of at most 10 units, wherein the sum of the wt. % equals 100 wt. %. The pigment/resin solids ratio by weight of coating composition B is, for example, 0.1:1 to 1:1.

A black pigment with low NIR absorption is one which, when pigmenting a coating composition with the respective black pigment and a 100 to 1000 nm thick aluminum flake pigment in a pigment weight ratio of 10:90 and without using other pigments, results in the NIR reflection of a dried or cured coating layer applied from the coating composition in an NIR-opaque film thickness being at least 33% over the entire wavelength range of 780 to 2100 nm. The NIR reflection can be measured as explained above for the measurement of the NIR reflection of an NIR-opaque coating layer. Preferred examples of black pigments with low NIR absorption are iron oxide black pigments, mixed metal/iron oxide black pigments, for example, of the inverse spinel type, and, in particular, perylene black pigments. Examples of commercially available perylene black pigments are Paliogen Black L 0084 and Paliogen Black L 0086 from BASF.

The pigment content of coating composition B may consist exclusively of the at least one black pigment with low NIR absorption or it may also comprise above 0 to 50 wt. % of at least one further pigment which is selected in such a way that coating layer B' exhibits low NIR absorption and that the dark-color multi-layer coating produced by the process of the present invention exhibits a brightness L* (according to CIEL*a*b*, DIN 6174), measured at an illumination angle of 45 degrees to the perpendicular and an observation angle of 45 degrees to the specular, of at most 10 units. In other words, the selection of the at least one further pigment is performed in a manner meeting two conditions, namely condition (i) relating to the low NIR absorption of coating layer B' and, simultaneously, condition (ii) relating to the brightness L* of the dark-color multi-layer coating of at most 10 units.

This means with regard to condition (i): In case there is only one single further pigment its wt. % proportion is selected within said range of above 0 to 50 wt. % such that coating layer B' exhibits low NIR absorption; if the one single further pigment is a pigment with strong NIR absorption, the skilled person will select its wt. % proportion more at the lower end of said wt. % range, whereas in case of one single further pigment with low NIR absorption the opposite is possible. In case there is a combination of two or more further pigments with different NIR absorption power the same principles apply and the proportion of each of the further pigments may accordingly be selected within the range of above 0 to 50 wt. %, i.e., taking into account the NIR absorption of each individual further pigment.

At the same time this means with regard to condition (ii): In case there is only one single further pigment its wt. % proportion is selected within said range of above 0 to 50 wt. % such that the dark-color multi-layer coating exhibits a brightness L* (according to CIEL*a*b*, DIN 6174), measured at an illumination angle of 45 degrees to the perpendicular and an observation angle of 45 degrees to the specular, of at most 10 units; if the one single further pigment has a light color, the skilled person will not select its wt. % proportion at the upper end of said wt. % range, whereas in case of one single further pigment with a dark color this may be possible. In case there is a combination of two or more further pigments with not only different color but also different brightness the same principles apply and the proportion of each of the further pigments may accordingly be selected within the range of above 0 to 50 wt. %, i.e., taking into account the brightness of each individual further pigment.

The further pigment(s) that may optionally be contained in coating composition B, in addition to the at least one black pigment with low NIR absorption may, for example, be special effect pigments and/or pigments selected from white, colored and other black pigments (black pigments different from the black pigments with low NIR absorption).

Examples of special effect pigments that may be contained in coating composition B comprise the aluminum flake pigments as are contained in coating composition A and those special effect pigments that have been previously mentioned as examples of special effect pigments that may be contained in coating composition A in addition to the at least one aluminum flake pigment.

Examples of white, colored and other black pigments are conventional inorganic or organic pigments known to the person skilled in the art, such as, for example, titanium dioxide, carbon black, iron oxide pigments different from iron oxide black pigments, azo pigments, phthalocyanine pigments, quinacridone pigments, pyrrolopyrrole pigments, and perylene pigments different from perylene black pigments.

It is preferred that coating composition B does not contain any carbon black.

In case of a solvent- or waterborne coating composition B the black pigment(s) with low NIR absorption and the further pigments that may optionally be contained in coating composition B are generally ground with the exception of possible special effect pigments. Grinding is generally performed until at least 70% of the maximum tinting strength achievable in the non-volatile system of coating composition B is achieved (non-volatile system of coating composition B means resin solids of coating composition B plus non-volatile additives of coating composition B). The grinding may be performed in conventional assemblies known to the person skilled in the art. Generally, the grinding takes place in a proportion of the binder or in specific paste resins. The formulation is then completed with the remaining proportion of the binder or of the paste resin. In case of a powder coating composition B the pigments, except for possible special effect pigments, are comminuted making use of conventional methods known to the person skilled in the art of powder paint and coating. Pigment comminution may be performed, in particular, for example, while extruding the powder coating material, which has already been completely formulated by dry mixing of all the required components including the pigments.

The possible special effect pigments are not ground. In case of a solvent- or waterborne coating composition B they are generally initially introduced in the form of a commercially available paste, optionally, combined with organic solvents and, optionally, polymeric pigment wetting or dispersion aids and/or other additives, and then mixed with the binder(s). Special effect pigments in powder form may first be processed with organic solvents and, optionally, polymeric pigment wetting or dispersion aids and/or other additives to yield a paste. In case of a powder coating composition B they may be added to the already ground powder coating material and, for example, bonded to the surface of the powder coating particles.

Coating composition B may also contain one or more fillers, for example, in a total proportion of up to 20 wt. % based on the resin solids. For the fillers the same principles apply as are valid for the at least one further pigment, i.e., if fillers are contained in coating composition B they are selected in such a way that coating layer B' exhibits low NIR absorption. The fillers do not constitute part of the pigment content of coating composition B. Examples are barium sulfate, kaolin, talcum, silicon dioxide, layered silicates and any mixtures thereof.

Coating composition B may contain conventional additives in a total quantity of, for example, 0.1 to 5 wt. %, relative to its solids content. Examples are neutralizing agents, antifoaming agents, wetting agents, adhesion promoters, catalysts, leveling agents, anticratering agents, thickeners and light stabilizers, for example, UV absorbers and/or HALS compounds.

If coating composition B is a waterborne coating composition, it comprises water in a proportion of, for example, 60 to 90 wt. % and, optionally, also one or more organic solvents in a proportion of, for example, 0 to 20 wt. %. If it is a solventborne coating composition, it does not comprise water but one or more organic solvents in a proportion of, for example, 60 to 90 wt. %.

Examples of organic solvents which can be used in coating composition B are the same that have been previously mentioned as examples of organic solvents in connection with coating composition A.

The overall solids content of coating composition B is in the range of 10 to 40 wt. %, based on the total composition. Accordingly, the proportion of volatiles is 60 to 90 wt. %. The volatiles comprise the aqueous carrier and possible volatile additives. The aqueous carrier comprises water and the possible organic solvents.

The process of the present invention comprises the successive steps (1) and (2). The coating layers A' and B' applied in the course of the multi-layer coating process of the present invention are both cured. Curing of coating layers A' and B' may be performed at various points of time as will become apparent from the following.

In step (1) of the process of the present invention coating composition A is applied in a film thickness so as to form an NIR-opaque coating layer A' exhibiting low NIR absorption. Generally the film thickness of coating layer A' will then also correspond to at least black/white opacity or be even higher. Not least for cost reasons NIR-opaque coating layer A' is not applied unnecessarily thick. Generally the film thickness of coating layer A' is in the range of, for example, 7 to 30 μm, preferably 9 to 20 μm. Application may be performed by any coating application method, in particular, spray coating including, for example, pneumatic and/or bell application. The spray application may be electrostatically assisted.

Prior to application of a further coating coating layer A' may optionally be cured, for example, chemically crosslinked. Curing may be performed by application of heat, for example, baking the substrate provided with NIR-opaque coating layer A' at an object temperature in the range of, for example, 60 to 180° C.

Before step (2) of the process of the present invention is performed, coating layer A' may optionally be provided with a clear coat layer which will then take the form of an intermediate clear coat layer arranged between coating layers A' and B'. All known clear coats are in principle suitable as clear coat. Usable clear coats are here both solvent-containing one-component (1 pack) or two-component (2 pack) clear coats, water-dilutable one- or two-component clear coats, powder clear coats or aqueous powder clear coat slurries. After its application the clear coat may optionally be cured.

In step (2) of the process according to the invention coating composition B is applied onto the substrate provided with coating layer A' and, optionally, the intermediate clear coat layer. Application may be performed by any coating application method, in particular, spray coating including, for example, pneumatic and/or bell application. The spray application may be electrostatically assisted.

Coating composition B may be applied in a relatively thin film thickness to form a transparent coating layer B'; generally, the film thickness of a transparent coating layer B' is in the range of, for example, 4 to 20 µm. It is preferred however, that coating composition B is applied sufficiently thick so as to form a visually opaque coating layer B'; then its film thickness corresponds to or exceeds black/white opacity. The dry film thickness of a visually opaque coating layer B' is higher than that of a transparent coating layer B' and lies generally in the range of, for example, 8 to 30 µm.

As already mentioned, coating layer B' may be transparent, and in this case the color shade of the dark-color multi-layer coating is determined by the contributions of both coating layers A' and B', although in general coating layer B' makes the main contribution to the color shade of the dark-color multi-layer coating. If coating layer B' is a visually opaque coating layer, it is the coating layer which determines the color shade of the dark-color multi-layer coating. Both a transparent coating layer B' or a visually opaque coating layer B' may be the final outer coating layer of the dark-color multi-layer coating. On the other hand, it is also possible and even preferred that coating layer B' is covered by a clear coat layer which forms the final outer coating layer of the dark-color multi-layer coating. Generally such final outer clear coat does not or essentially not contribute to the color shade of the dark-color multi-layer coating.

If coating layer B' does not form the final outer coating layer of the dark-color multi-layer coating it may optionally be cured, for example, chemically crosslinked prior to being overcoated with the clear coat. In the alternative case of coating layer B' being the final outer coating layer of the dark-color multi-layer coating it is cured. Curing of coating layer B' may be performed by application of heat, for example, baking the substrate provided with NIR-opaque coating layer A', the possible intermediate clear coat layer and coating layer B' at an object temperature in the range of, for example, 60 to 180° C.

As already mentioned above, it is preferred that step (2) of the process according to the invention is followed by a step (3), namely the application and curing of a clear coat. All known clear coats are in principle suitable as the clear coat. Examples of clear coats which may be used are the same as those mentioned above in connection with the clear coat that may be applied as an intermediate clear coat arranged between coating layers A' and B'. Clear coat application may be performed in a film thickness of, for example, 20 to 80 µm by any suitable coating application method, in particular, spray coating. Curing of the clear coat layer may be performed by application of heat, for example, baking at an object temperature in the range of, for example, 60 to 180° C. It is preferred however to apply the final outer clear coat by the so-called wet-on-wet application method, i.e., to apply the clear coat onto the still uncured coating layer B' and to cure both coating layers simultaneously. This joint curing may be performed by application of heat, for example, baking the substrate provided with NIR-opaque coating layer A', the possible intermediate clear coat layer, the still uncured coating layer B' and the outer clear coat layer at an object temperature in the range of, for example, 60 to 180° C.

In a preferred embodiment of the process of the present invention curing of coating layer A' is performed in the course of step (1) and step (2) is followed by step (3), wherein coating layer B' and the clear coat layer applied in step (3) are jointly cured.

In a further preferred embodiment of the process of the present invention step (1) does not include curing of coating layer A' and step (2) is followed by step (3), wherein coating layers A', B' and the clear coat layer applied in step (3) are jointly cured.

EXAMPLES

Unless otherwise noted, all components of the following examples are believed to be available from the Aldrich Chemical Company, Milwaukee, Wis. The following other components were used in the examples.

CYMEL® 303 melamine and DAOTAN® VTW 1236 aqueous aliphatic polyurethane dispersion are available from Cytec Industries, West Patterson, N.J.

SOLSPERSE® 20000 dispersant is available from the Lubrizol Corporation, Wickliffe, Ohio.

SURFYNOL® 104 nonionic surfactant is available from Air Products and Chemicals, Inc., Allentown, Pa.

PALIOGENBLACK® BLACK L 0086 pigment is available from BASF, Germany.

CARBON BLACK FW 200® pigment is available from Evonik Industries, Essen, Germany.

LAPONITE® RD sheet silicate is available from Southern Clay Products, Gonzales, Tex.

ACRYSOL® ASE 60 anionic thickener is available from Rohm and Haas (now part of the Dow Chemical Company, Midland Mich.), Philadelphia, Pa.

STAPA®HYDROLAN 2154 and HYDROLAN 8154 metal effect pigments are available from Altana/Eckart, Fürth, Germany.

Preparation of A Carbon Black Pigment Dispersion

The following pigment slurry was prepared with 33.4 g (grams) of de-ionized water, 9.4 g of a 30% non-volatile hydroxy functional aqueous acrylic microgel, 18.8 g butoxyethanol, 14.1 g CYMEL® 303, 4.7 g SOLSPERSE® 20000 and 6.6 g of 10% aqueous dimethylethanol amine solution and 0.5 g SURFYNOL® 104. The above components were mixed together, 12.5 g of CARBON BLACK FW 200® pigment was added and the resulting slurry was pre-dispersed using a Cowles blade. The mixture was then ground in a horizontal beadmill until the desired particle size of less than 0.5 micron was achieved.

Preparation of A Perylene Black Pigment Dispersion

The following pigment slurry was prepared with 27.5 g of de-ionized water, 7.7 g of a 30% non-volatile hydroxy functional aqueous acrylic microgel, 15.5 g butoxyethanol, 11.6 g CYMEL® 303, 3.9 g SOLSPERSE® 20000 and 5.4 g of 10% aqueous dimethylethanol amine solution and 0.4 g SUR-FYNOL® 104. The above components were mixed together, 28.0 g of PALIOGENBLACK® BLACK L 0086 pigment was added and the resulting slurry was pre-dispersed using a Cowles blade. The mixture was then ground in a horizontal beadmill until the desired particle size of less than 0.5 micron was achieved.

Preparation of A Rheology Base

A homogeneous blend was prepared by mixing together and stirring 47.5 g of a 30% non-volatile hydroxy functional aqueous acrylic microgel, 2.0 g of butoxyethanol and 0.5 g of SURFYNOL® 104. Following this, 50.0 g of 3% LAPO-NITE® RD in de-ionized water was added under stirring and homogenized and dispersed using a horizontal beadmill.

Preparation of A Waterborne Black Coating Composition (Containing Carbon Black):

A waterborne black coating composition was prepared by mixing together the following constituents under constant agitation in the order stated: 26.8 pbw (parts by weight) of a 30% non-volatile hydroxyl-functional aqueous acrylic microgel, 16.2 pbw of carbon black pigment dispersion, 5.8 pbw of CYMEL® 303, 13.8 pbw of rheology base, 1.0 pbw of SURFYNOL® 104, and 2.0 pbw of butoxyethanol. The viscosity of the coating composition was adjusted to within the desired range of 2000-4000 mPa·s at shear rate $D=1$ $sec^{-1}$, and the pH was adjusted to within the desired range of 8.2-8.8 using 34.4 pbw of a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Preparation of A Waterborne Black Coating Composition (Containing Perylene Black):

A waterborne black coating composition was prepared by mixing together the following constituents under constant agitation in the order stated: 26.8 pbw of a 30% non-volatile hydroxy functional aqueous acrylic microgel, 16.2 pbw of perylene black pigment dispersion, 5.8 pbw of CYMEL® 303, 13.8 pbw of rheology base, 1.0 pbw of SURFYNOL® 104, and 2.0 pbw of butoxyethanol. The viscosity of the coating composition was adjusted to within the desired range of 2000-4000 mPa·s at shear rate $D=1$ $sec^{-1}$, and the pH was adjusted to within the desired range of 8.2-8.8 using 34.4 pbw of a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Preparation of A Waterborne Silver Coating Composition:

A waterborne silver coating composition was prepared by mixing together the following constituents under constant agitation in the order stated: 20.0 pbw of a 30% non-volatile hydroxy functional aqueous acrylic microgel, 3 pbw of DAO-TAN® VTW 1236, 5.0 pbw of STAPA® Hydrolan 2156, 1.6 pbw of STAPA® Hydrolan 8154, 3.0 of pbw CYMEL® 303, 18.0 pbw of rheology base, 2.0 pbw of butoxyethanol, and 1.0 pbw of SURFYNOL® 104. The viscosity of the coating composition was adjusted to within the desired range of 2000-4000 mPa·s at shear rate $D=1$ $sec^{-1}$, and the pH was adjusted to within the desired range of 7.8-8.0 using 46.4 pbw of a combination of (i) de-ionized water, (ii) a 10% non-volatile pre-neutralized solution of ACRYSOL® ASE 60 in de-ionized water and (iii) a 10% aqueous dimethylethanol amine solution in de-ionized water.

Solventborne Clear Coat Composition:

The clear coat composition used for the examples was a collision baking clear, commercially available from DuPont Performance Coatings (Standox), Christbusch 25, D-42285 Wuppertal, Germany, prepared by mixing STANDOCRYL® 2K-HS Clearcoat, 020-82497, with STANDOX® 2K-HS Hardener, 020-82403, in a 2:1 volume ratio.

Application of Waterborne Coating Compositions And Clear Coat:

Four 10.5 cm×30 cm, 1 mm thick steel test panels were processed and prepared with standard automotive pre-treatment, and dried and cured layers of grey electrocoat and midgrey primer.

Two of the test panels were coated by spray-applying the waterborne silver coating composition onto the surface of the midgrey primer. The waterborne silver coating composition was spray-applied in 14 μm dry layer thickness and dried for 10 minutes at 20° C. Then one of the black waterborne coating compositions was spray-applied in 10 μm dry layer thickness and dried for 10 minutes at 20° C. Finally the clear coat was spray-applied in 40 μm dry layer thickness and dried for 5 minutes at 20° C. The test panels were put in an oven and bake cured for 20 minutes at 145° C. (object temperature).

The two remaining test panels were coated by spray-applying the waterborne black coating compositions onto the surface of the midgrey primer. The black waterborne coating compositions were spray-applied in 10 μm dry layer thickness and dried for 10 minutes at 20° C. Finally the clear coat was spray-applied in 40 μm dry layer thickness and dried for 5 minutes at 20° C. Then the test panels were put in an oven and bake cured for 20 minutes at 145° C. (object temperature).

The test panels so provided with a black multi-layer coating different from each other were tested as follows:

A rectangular, open wooden box (dimensions inside 9.5 cm×29.4 cm, dimensions outside 12.6 cm×31.9 cm, height inside 5 cm and height outside 6.5 cm) was provided with a digital thermometer inside. To this end, the temperature sensor was fixed on a copper panel (8.5 cm×25.3 cm, thickness 1 mm) at the bottom inside the box. The box was closed by using one of the 10 cm×30 cm black coated test panels as a lid with the black coated surface turned outside. Then the box was put on a table and illuminated from above with a halogen lamp (Osram, No. 64575, 1000 W) over 35 min (simulation of heating up in sunlight). The distance between the black coated test panel surface and the light source was 35 cm and the temperature in the test room was 23° C. The temperature increase ΔT within the box was measured. Table 1 shows the results.

TABLE 1

| Multi-layer coating on the test panel: | ΔT (° C.) |
|---|---|
| Waterborne carbon black coating + clear coat | 24.3 |
| Waterborne perylene black coating + clear coat | 23.1 |
| Waterborne silver coating + carbon black coating + clear coat | 23.9 |
| Waterborne silver coating + perylene black coating + clear coat | 17.9 |

What is claimed is:

1. A process for the production of a dark-color multi-layer coating, comprising the successive steps:
   (1) applying an NIR-opaque coating layer A' from a pigmented, solvent- or waterborne coating composition A to a substrate, (2) applying a coating layer B' from a pigmented coating composition B onto the substrate provided with coating layer A',
wherein the pigment content of coating composition A consists 90 to 100 wt. % of at least one aluminum flake pigment and 0 to 10 wt. % of at least one further pigment, and the pigment content of coating composition A is selected in such a way that NIR-opaque coating layer A' exhibits an NIR reflection of at least 48% over the entire NIR wavelength range of 780 to 2100 nm,
wherein the pigment content of coating composition A comprises <90 wt. % of 10 to 80 nm thick aluminum flake pigments,
wherein the pigment content of coating composition B consists 50 to 100 wt. % of at least one black pigment with low NIR absorption and 0 to 50 wt. % of at least one further pigment, and the pigment content of coating composition B is selected in such a way that coating layer B' exhibits low NIR absorption and that the dark-color multi-layer coating exhibits a brightness L* (according to CIEL*a*b*, DIN 6174), measured at an illumination angle of 45 degrees to the perpendicular and an observation angle of 45 degrees to the specular, of at most 10 units,
wherein the sum of the respective wt. % equals 100 wt. %, and
wherein the coating layers A' and B' are cured.

2. The process of claim 1, wherein the pigment content of coating composition A consists exclusively of the at least one aluminum flake pigment.

3. The process of claim 1, wherein coating composition A does not contain any carbon black.

4. The process of any one of the preceding claims, wherein the at least one black pigment with low NIR absorption is selected from the group consisting of iron oxide black pigments, mixed metal/iron oxide black pigments and perylene black pigments.

5. The process of claim 1, wherein coating composition B does not contain any carbon black.

6. The process of claim 1, wherein coating layer B' is a transparent or a visually opaque coating layer.

7. The process of claim 1 comprising a further successive step (3) of application and curing of a clear coat.

8. The process of claim 7, wherein coating layer A' is cured in step (1) and coating layer B' and the clear coat layer applied in step (3) are jointly cured.

9. The process of claim 7, wherein coating layers A', B' and the clear coat layer applied in step (3) are jointly cured.

10. A substrate provided with a dark-color multi-layer coating produced by the process of claim 1.

* * * * *